United States Patent
Bisballe

(10) Patent No.: US 10,292,342 B2
(45) Date of Patent: *May 21, 2019

(54) HARVESTER HEAD ASSEMBLY

(71) Applicant: Chad Bisballe, Lake City, MI (US)

(72) Inventor: Chad Bisballe, Lake City, MI (US)

(*) Notice: Subject to any disclaimer, the term of this patent is extended or adjusted under 35 U.S.C. 154(b) by 44 days.

This patent is subject to a terminal disclaimer.

(21) Appl. No.: 15/421,765

(22) Filed: Feb. 1, 2017

(65) Prior Publication Data

US 2017/0135294 A1 May 18, 2017

Related U.S. Application Data

(63) Continuation of application No. 14/141,689, filed on Dec. 27, 2013, now Pat. No. 9,591,810.

(60) Provisional application No. 61/746,398, filed on Dec. 27, 2012.

(51) Int. Cl.
*A01G 23/083* (2006.01)
*B23D 47/12* (2006.01)

(52) U.S. Cl.
CPC ........... *A01G 23/083* (2013.01); *B23D 47/12* (2013.01); *Y10T 29/49826* (2015.01)

(58) Field of Classification Search
CPC .... A01G 23/08; A01G 23/081; A01G 23/083; A01G 23/091; A01G 23/093; A01G 23/095; F15B 2211/20553; F15B 2211/20546
See application file for complete search history.

(56) References Cited

U.S. PATENT DOCUMENTS

| | | | | |
|---|---|---|---|---|
| 5,957,177 A * | 9/1999 | Smith | ..................... | B27B 25/02 144/208.1 |
| 6,267,163 B1 * | 7/2001 | Holmes | ................ | A01G 23/081 144/336 |
| 7,644,580 B2 * | 1/2010 | Alfthan | ................ | A01G 23/095 60/425 |
| 2010/0282367 A1 * | 11/2010 | Stevenson | ............ | A01G 23/091 144/336 |
| 2011/0196582 A1 * | 8/2011 | Degroot | ................ | E02F 9/2217 701/50 |
| 2012/0261032 A1 * | 10/2012 | Raszga | .................. | A01G 23/08 144/336 |

* cited by examiner

*Primary Examiner* — Matthew Katcoff
(74) *Attorney, Agent, or Firm* — Dickinson Wright PLLC

(57) ABSTRACT

An improved harvester head assembly is provided. The harvester head includes a housing which is rotatable between a horizontal orientation and a vertical orientation. The harvester head further includes feeding system with a central feed roller and a pair of outer feed rollers that are moveable relative to the housing. The harvester head also includes top and bottom saws. A pair of delimbing knives are pivotable relative to the housing. A manifold and valve assembly is disposed in the housing and includes a plurality of solenoid valves which are configured to channel hydraulic fluid to motors and actuators to power and/or move a plurality of the components. The manifold and valve assembly includes a manifold with a rectangular shape and which is oriented with its long dimension extending in a longitudinal direction. The solenoid valves are spaced from one another in the longitudinal direction.

14 Claims, 8 Drawing Sheets

HARVESTER HEAD ASSEMBLY

CROSS-REFERENCE TO PRIOR APPLICATIONS

This U.S. Continuation Patent Application claims the benefit of U.S. patent application Ser. No. 14/141,689 filed Dec. 27, 2013 entitled "Harvester Head Assembly," which claims the benefit of U.S. Provisional Patent Application Ser. No. 61/746,398 filed Dec. 27, 2012, entitled "Harvester Head Assembly", the entire disclosures of the applications being considered part of the disclosure of this application and hereby incorporated by reference.

BACKGROUND OF THE INVENTION

1. Field of the Invention

The present invention is related to harvester head assembly for chopping, delimbing, and cutting trees to predetermined lengths.

2. Related Art

In the modern logging industry, many logging companies utilize harvester heads, such as those sold under the mark Waratah®, attached to harvesters to chop, delimb, and cut trees into logs of predetermined lengths in a very efficient manner. Typical harvester heads typically have a pair of delimbing knives; at least one saw and at least one feeding wheel. In operation, the arms of the harvester wrap around the trunk of a tree adjacent its base. Then, the at least one saw cuts the tree to separate it from the ground, and the harvester head lifts the remaining portion of the tree off of the ground. Next, the feeding wheels feed the sawed off portion of the tree through the harvester head by a predetermined distance while the delimbing knives simultaneously cut any limbs or branches off of the tree. After the feeding wheels have fed the sawed off portion of the tree by a predetermined distance, such as ten feet, the at least one saw is activated again to cut the fed length of tree into a pole with a predetermined length. This process may all be completed in a short period of time.

Harvester heads are typically optimized for certain tree sizes and types. For example, one type of harvester head might be optimized for hard wood trees of between 10-18 inches in diameter and another type of harvester head might be optimized for soft wood trees of between 6-10 inches in diameter. Additionally, typical harvester heads are only configured to work with certain types of harvesters.

As with harvester heads, harvesters come in various types and sizes. Light and medium duty harvesters typically include six total wheels whereas heavy duty harvesters typically include two continuous tracks (also known as caterpillar tracks) and two wheels. Wheeled harvesters may provide increased maneuverability as compared with tracked harvesters, whereas tracked harvesters may weigh more than wheeled harvesters and thus may be capable of lifting and processing relatively larger trees than wheeled harvesters.

SUMMARY OF THE INVENTION

One aspect of the present invention provides for a harvester head assembly which includes a frame that is generally U-shaped. A housing is rotatably coupled with the frame and is rotatable between a horizontal orientation and a vertical orientation. The housing extends in a longitudinal direction between opposite longitudinal ends. The harvester head further includes feeding system with a central feed roller and a pair of outer feed rollers that are moveable relative to the housing. A top saw is located adjacent one of the longitudinal ends of the housing, and a bottom saw is located adjacent the other of the longitudinal ends. Both the top and bottom saws are pivotable relative to the housing. A pair of delimbing knives are pivotably coupled with the housing and are pivotable between open and closed positions. A hydraulic manifold and valve assembly are operable to receive a hydraulic fluid and to channel the hydraulic fluid to at least power the feed system, pivot the outer rollers relative to the housing, power the bottom saw, pivot the bottom saw relative to the housing and pivot the delimbing knives relative to the housing. The hydraulic manifold and valve assembly includes a manifold that is generally rectangularly shaped and has a long dimension that extends in the longitudinal direction and a plurality of solenoid valves which are spaced longitudinally from one another and have spindles that are moveable in opposite lateral directions that are generally perpendicular to the longitudinal direction.

According to another aspect of the present invention, each of the spindles is moveable in the opposite lateral directions by no more than one inch.

According to yet another aspect of the present invention, a plurality of top saw valves for controlling the top saw are disposed within the housing and are spaced from the hydraulic manifold and valve assembly.

The harvester head assembly has improved compatibility as compared to other similar harvester head assemblies and is operable with a very wide range of harvesters including wheeled harvesters.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
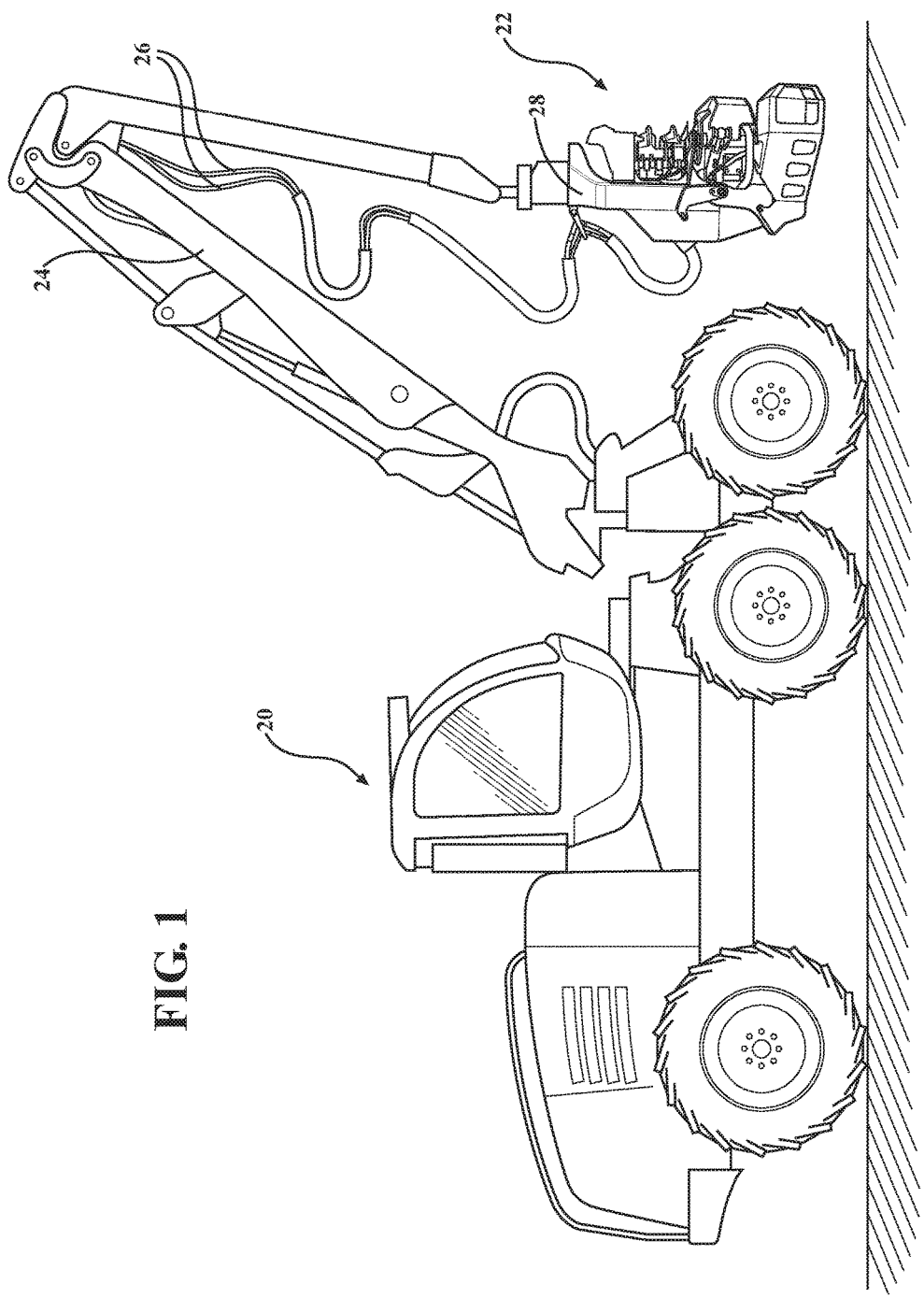
FIG. 1 is a perspective view of an exemplary harvester head coupled with an exemplary harvester.

Referring to the Figures, wherein like numerals indicate corresponding parts throughout the several views, an exemplary embodiment of a harvester 20 and a harvester head 22 assembly is generally shown in FIG. 1. As shown, the exemplary harvester 20 is a three axle, six wheeled harvester 20 with an elongated, two piece boom 24, and the pieces of the boom 24 are interconnected at a controllable joint. The harvester 20 includes at least one hydraulic pump 25 (shown schematically in FIG. 10) for controllably moving the boom 24 and also for powering the various components of the harvester head 22, as will be discussed in further detail below. A plurality of hydraulic fluid lines 26 extend from a main body of the harvester 20 along the length of the boom 24 and are fluidly connected with the harvester head 22 for channeling the hydraulic fluid from the hydraulic pump to and from the harvester head 22. The exemplary harvester 20 has a 9.0 liter engine which produces a peak power output of approximately 228 horsepower and a peak torque output of approximately 830 ft*lbs. The front axles of the exemplary harvester 20 are bogie axles, and the rear axle is a rigid axle. The hydraulic pump 25 has an operating pressure of between 24-28 MPa.

Figure 2:
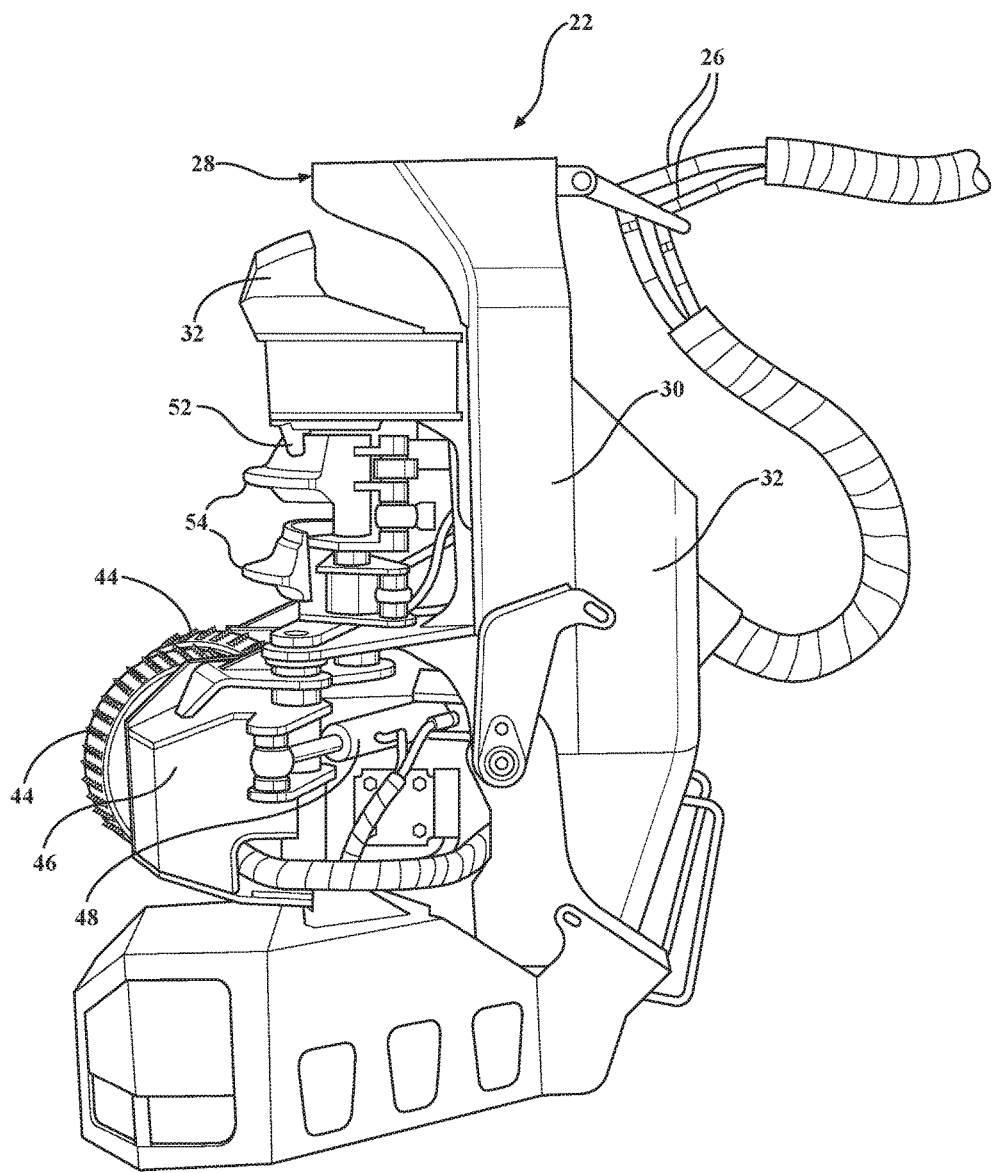
FIG. 2 is a side elevation view of the exemplary harvester head.

Referring now to FIG. 2, an improved harvester head 22 assembly is generally shown. The exemplary harvester head 22 is configured for use on a wider range of different harvesters including both wheeled harvesters, such as the harvester 20 shown in FIG. 1, and tracked harvesters (not shown) as compared to other known harvester heads which have more limited compatibility, i.e., the harvester head 22 has improved compatibility. As will be discussed in further detail below, the harvester head 22 is adapted for chopping, delimbing, and cutting tress of a wider range of types, shapes and sizes as compared to other known harvester heads that are compatible with certain types of harvesters, such as the harvester 20 shown in FIG. 1 and discussed above.

Figure 3:
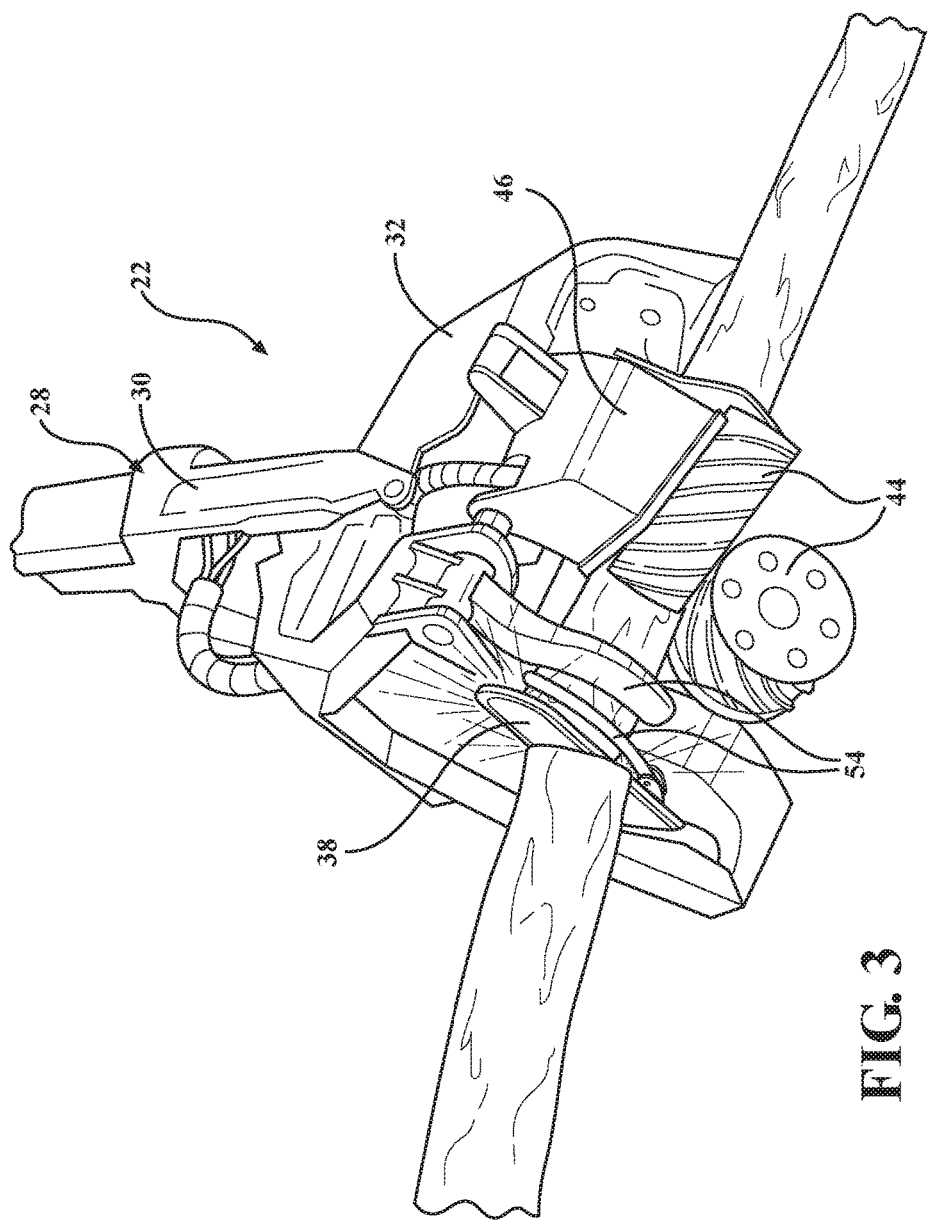
FIG. 3 is a perspective view of the exemplary harvester head during operation.

Referring now to FIG. 2, the exemplary harvester head 22 includes a generally U-shaped frame 28 which is configured for attachment with a distal end of the boom 24 (shown in FIG. 1) and has a pair of spaced vertical legs 30 which extend in parallel relationship with one another. The harvester head 22 also includes a housing 32 which is rotatably joined to the ends of the vertical legs 30 of the U-shaped frame 28 for rotation thereabout. In other words, the housing 32 is rotatable relative to the frame 28. For example, FIG. 2 shows the housing 32 of the harvester head 22 in a vertical orientation such that it extends in parallel with the vertical legs 30 and perpendicular to the ground, and FIG. 3 shows the harvester head 22 in a horizontal orientation such that it extends generally perpendicularly to the vertical legs 30 and parallel with the ground. The harvester head 22 includes at least one hydraulically powered motor or actuator within the housing 32 for controlling the rotation of the housing 32 relative to the U-shaped frame 28.

Figure 8:
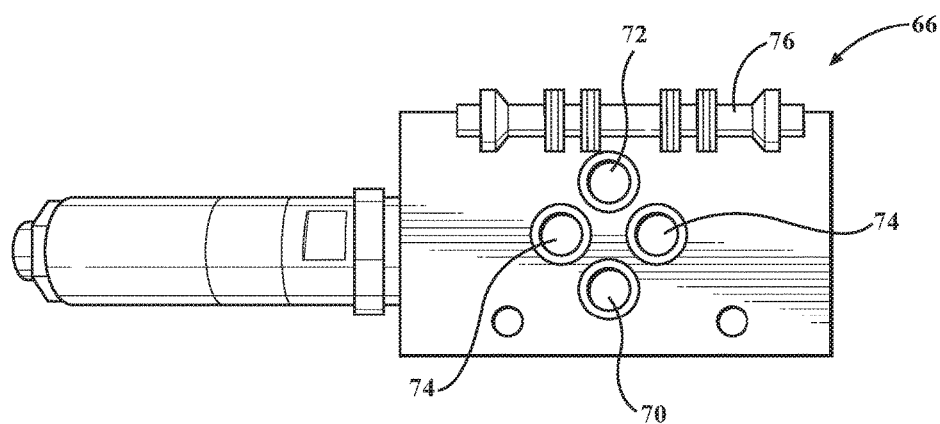
FIG. 8 is a partially exploded view of an exemplary solenoid valve.
Figure 9:
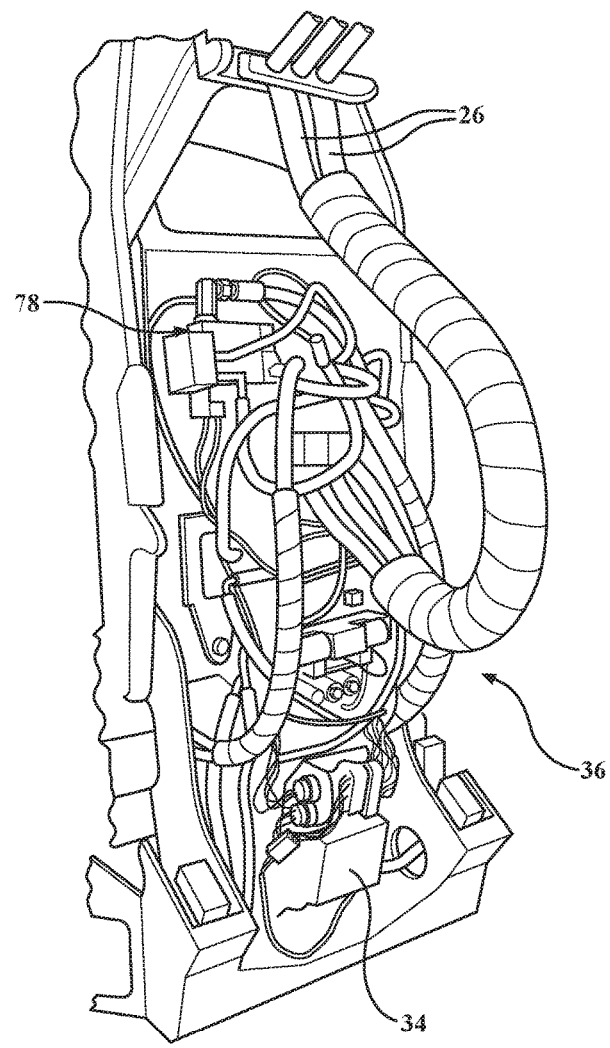
FIG. 9 is a perspective view of the exemplary harvester head with a cover removed.

Referring now to FIG. 9, the housing 32 of the harvester head 22 contains an electronic control unit, also known as a flex box 34, and a hydraulic manifold and valve assembly 36. The flex box 34 is in electrical communication with the harvester 20 (shown in FIG. 1) and also with a plurality of solenoids 35 (one of which is shown in FIG. 8) on the hydraulic manifold and valve assembly 36. The hydraulic manifold and valve assembly 36 is in fluid communication with the hydraulic fluid lines 26 from the harvester 20 for receiving hydraulic fluid therefrom and for distributing the hydraulic fluid to the various components of the harvester head 22 to power those components, e.g., operating the hydraulic motors to tilt the housing 32 of the harvester head 22 relative to the U-shaped frame 28 between the vertical and horizontal orientations discussed above. During operation, a user operates controls in the cab of the harvester 20, and a computer (not shown) in the harvester 20 transmits an electronic signal to the flex box 34 in the harvester head 22.

The flex box 34 receives the signal from the harvester 20 and transmits a different signal to the appropriate solenoid or solenoids 35 in the hydraulic manifold and valve assembly 36 to channel the hydraulic fluid to power the appropriate components in the harvester head 22 so that they may perform the operations instructed by the user within the harvester 20.

Figure 4:
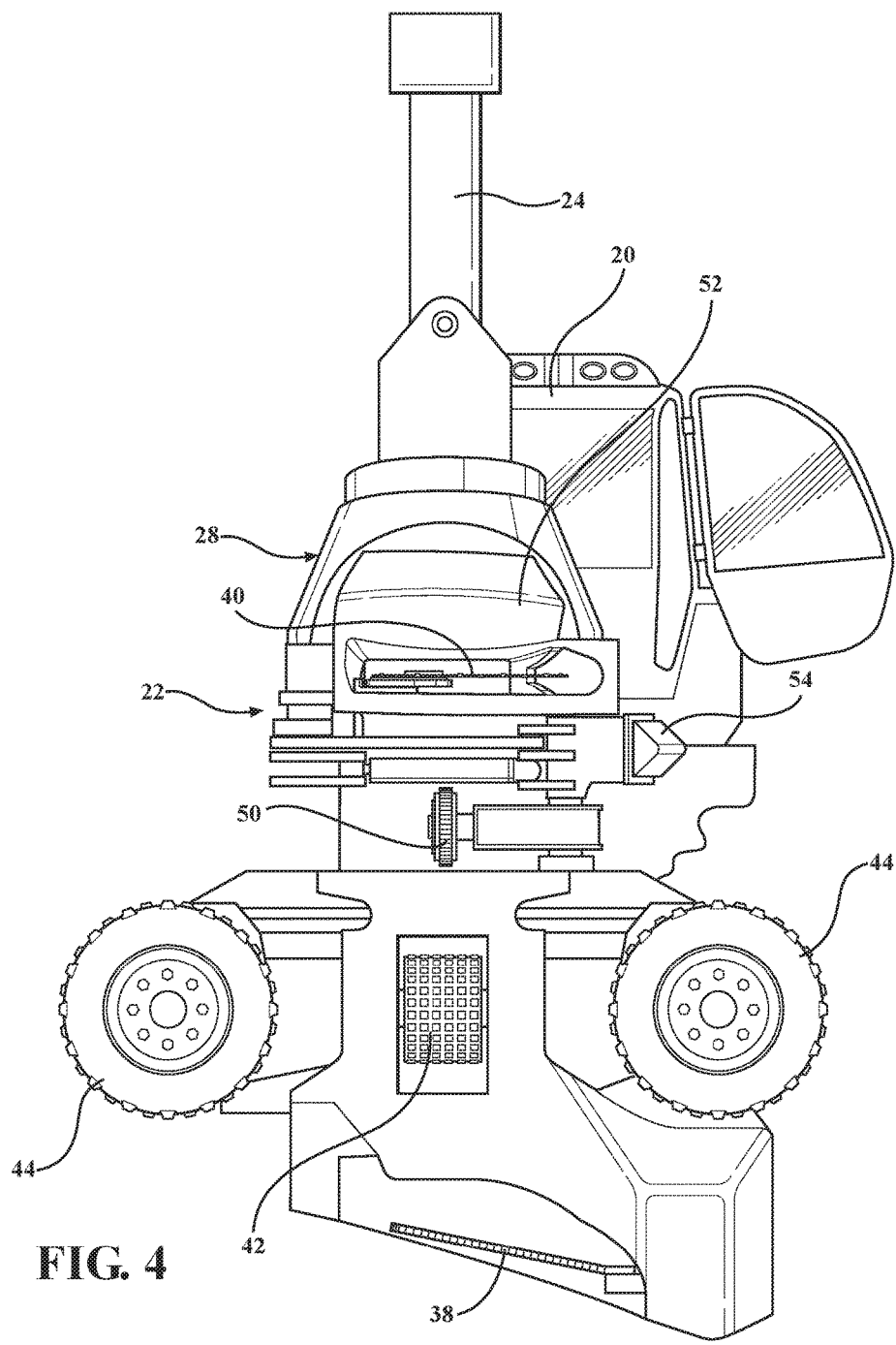
FIG. 4 is a front elevation view of the exemplary harvester head.
Figure 5:
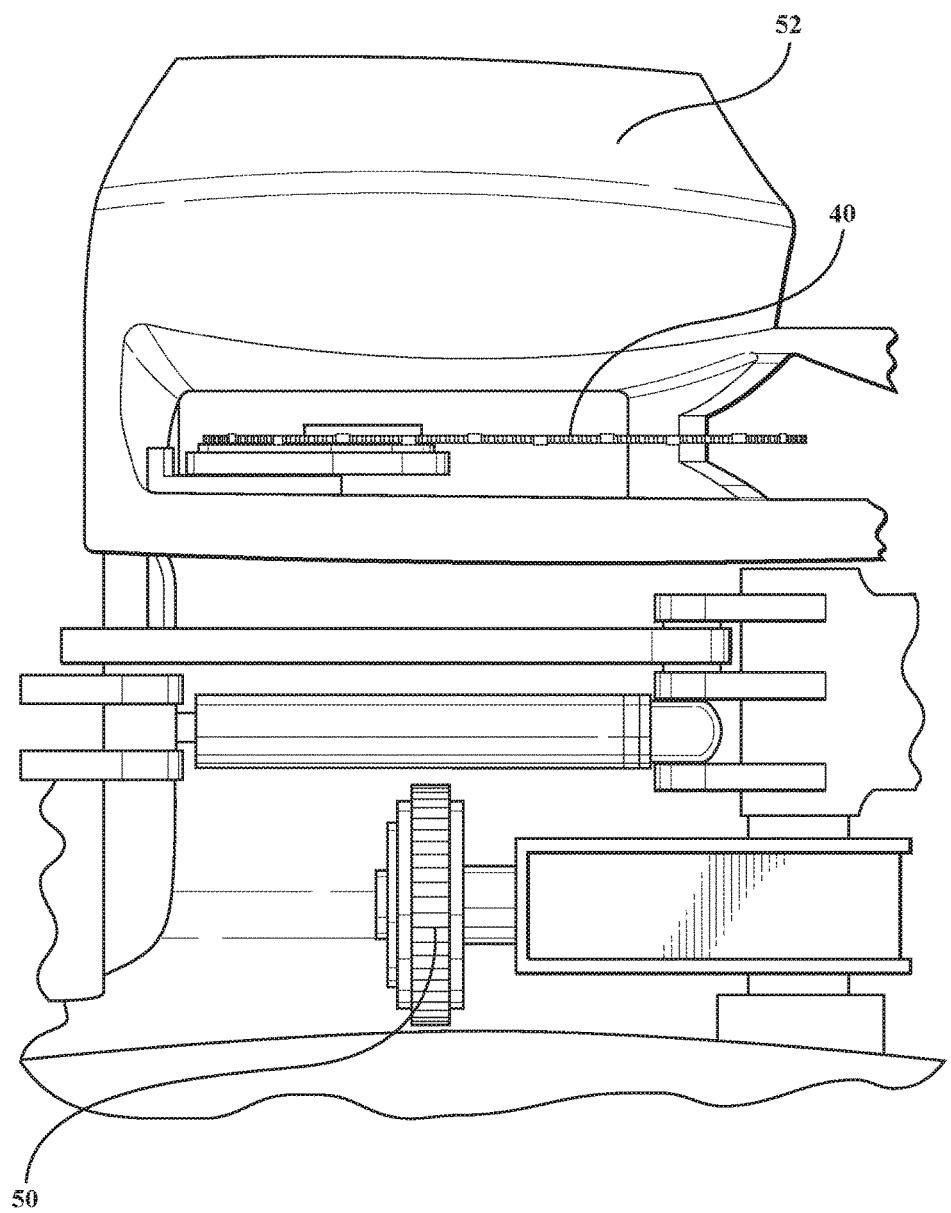
FIG. 5 is an enlarged view of the exemplary harvester head around a top saw.
Figure 6:
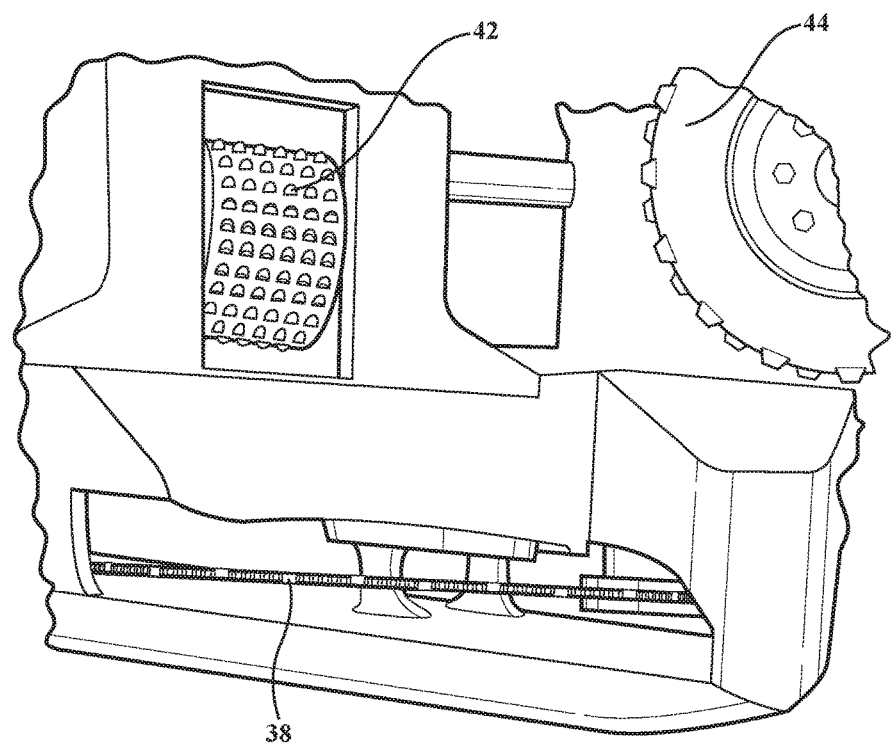
FIG. 6 is an enlarged view of the exemplary harvester head around a bottom saw.

Referring now to FIG. 4, the harvester head 22 also includes a pair of saws 38, 40 for cutting trees from the ground and for cutting the trees into logs of predetermined lengths. As best shown in FIG. 6, one of the saws 38 is a bottom saw 38 and is located adjacent one longitudinal end of the housing 32. The bottom saw 38 of the exemplary harvester head 22 has a maximum cutting diameter of approximately twenty-two inches (22"). The other saw 40 is a top saw 40 and is located at the opposite end of the housing 32 from the bottom saw 38. The top saw 40 has a maximum cutting diameter of approximately thirteen inches (13"). Each of the saws 38, 40 is controllably rotatable relative to the housing 32. During operation of the harvester head 22, the bottom saw 38 is typically used to cut the tree away from the ground and to section the tree into logs of predetermined lengths. The top saw 40 is best shown in FIG. 5 and is typically used to make the final cut and to remove the top of the tree from a log during operation of the harvester head 22. As shown schematically in FIG. 10, each of the saws 38, 40 is operably coupled with a hydraulic motor 41, 43 for powering the respective saws and a hydraulic actuator 45, 47 for rotating the saw relative to the housing 32 during cutting.

Referring back to FIG. 4, the exemplary harvester head 22 includes a feeding system with a total of three feed rollers 42, 44 which are all disposed longitudinally between said bottom and top saws 38, 40 for moving the tree relative to the harvester head 22. One of the feed rollers 42 is a central feed roller 42 and is disposed partially within the housing 32 and projects outwardly from a lower surface of the housing 32 for frictionally engaging the tree. The other two feed rollers 44 are outer feed rollers 44 and are moveable relative to the housing 32. Specifically, as best shown in FIG. 2, the outer feed rollers 44 are mounted on arms 46 which are pivotably coupled with the housing 32. Hydraulic actuators 48 extend from the housing 32 to the arms 46 for controllably rotating the arms 46 to move the outer feed rollers 44 relative to the housing 32 between open positions for receiving and releasing trees or logs and closed positions for engaging trees or logs. For example, the outer feed rollers 44 are shown in the open positions in FIG. 4 and in the closed positions in FIG. 3. When the harvester head 22 is engaged with a tree, all three of the feed rollers 42, 44 frictionally engage with the tree, and rotation of the feed rollers 42, 44 causes the tree to move relative to the harvester head 22. Referring back to FIG. 4, a sensor 50 is operably coupled with the housing 32 for measuring the amount of movement of the tree relative to the harvester head 22 during operation of the harvester head 22. The harvester head 22 additionally includes at least one sensor for sensing the diameter of the tree which is being engaged by the harvester head 22 assembly. Each of the feed rollers 42, 44 is formed of hardened steel and has a diameter of approximately seven inches (7"). The feed rollers 42, 44 are powered by hydraulic motors 49 (shown schematically in FIG. 10) which are in fluid communication with the hydraulic manifold and valve assembly 36 for receiving the hydraulic fluid therefrom. In the exemplary embodiment, the harvester head 22 includes four total hydraulic motors 49, two of which power the central feed roller 42 and the other two of which power the outer feed rollers 44.

The harvester head 22 additionally includes a total of three delimbing knives 52, 54 for removing limbs and/or at least some bark from the tree during operation of the harvester head 22. As best shown in FIG. 4, one of the delimbing knives is a stationary knife 52 which is attached to the housing 32 adjacent the top saw 40. The other two knives are non-stationary knives 54 which are pivotable relative to the housing 32 between open positions, which are shown in FIG. 4, and closed positions, which are shown in FIG. 2. The non-stationary delimbing knives 54 are located on the housing 32 longitudinally between the top saw 40 and the sensor 50 of the harvester head 22. The non-stationary knives 54 are hydraulically actuated and, during operation of the harvester head 22, they are biased against the tree by hydraulic actuators 55 (shown schematically in FIG. 10) to cut limbs and branches from the tree while the feed rollers 42, 44 move the tree through the harvester head 22. Together with the outer feed rollers 44, the delimbing knives 52, 54 also function to hold the tree off of the ground after it has been cut therefrom during operation of the harvester head 22.

Figure 10:
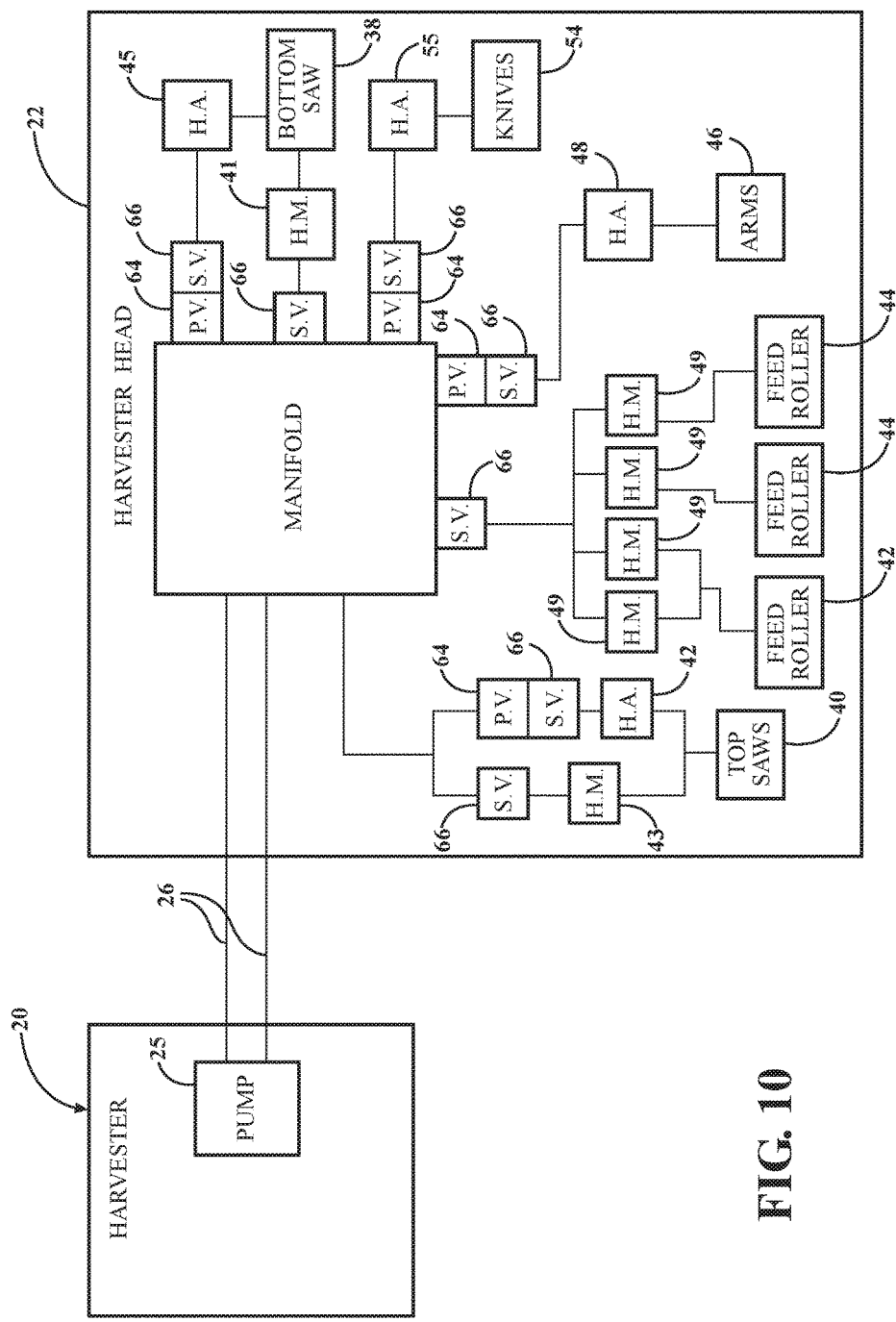
FIG. 10 is a schematic view of the exemplary harvester and harvester head assembly of FIG. 1.

As discussed above, the movements of the delimbing knives 52, 54, the saws 38, 40, the arms 46 and the feed rollers 42, 44 are all hydraulically powered. As best shown in FIGS. 9 and 10, the hydraulic manifold and valve assembly 36 is positioned within the housing 32 of the harvester head 22 and is hydraulically connected with the hydraulic fluid lines 26 to receive the hydraulic fluid from the at least one hydraulic pump in the harvester 20. A plurality of hydraulic lines also extend from the hydraulic manifold and valve assembly 36 to the various hydraulically powered motors and actuators of the harvester head 22 except for the top saw 40, as discussed in further detail below. The hydraulic manifold 56 is generally rectangular in shape and is oriented within the housing 32 such that the long dimension of the rectangular shape extends in the longitudinal direction of the harvester head 22.

Figure 7:
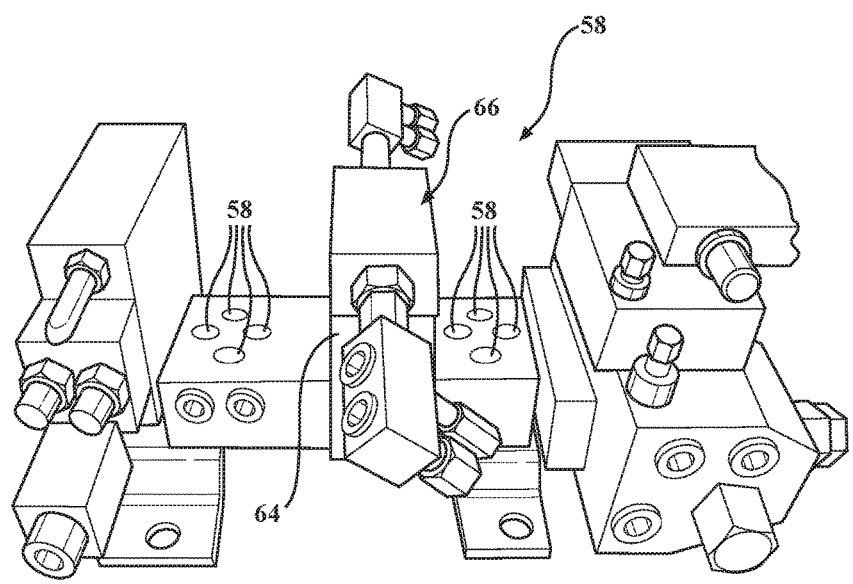
FIG. 7 is a fragmentary view of an exemplary hydraulic manifold and valve assembly for the exemplary harvester head.

Referring now to the fragmentary view of FIG. 7, the hydraulic manifold 56 has a plurality of sets of openings 58 on a top surface thereof with the sets of openings 58 being spaced longitudinally from one another. Each of the sets is configured for dispersing the hydraulic fluid to one of the hydraulically powered components of the harvester head 22 and for receiving the hydraulic fluid therefrom. Referring now to FIGS. 7 and 10, during operation of the harvester head 22, one set of openings 58 channels the hydraulic fluid to the hydraulic motor 41 to power the bottom saw 38, one set of openings 58 channels the hydraulic fluid to the hydraulic actuator 45 to move the bottom saw 38; one set of openings 58 channels the hydraulic fluid to the hydraulic actuator 55 to move the non-stationary delimbing knives 54; one set of openings 58 channels the hydraulic fluid to the hydraulic actuators 48 to move the outer feed rollers 44 between the open and closed positions; and one set of openings 58 channels the hydraulic fluid to the hydraulic motors 49 to power the feed rollers 42, 44.

For moving the bottom saw 38, a proportional valve 64, such as the proportional valve 64 shown in FIG. 7, is disposed on the top surface of the hydraulic manifold 56 for receiving the hydraulic fluid from one of the sets of openings 58, and a solenoid valve 66, such as the solenoid valve 66 shown in FIGS. 7 and 8, is positioned on top of the proportional valve 64. The proportional valve 64 is configured to control the volumetric flow rate of hydraulic fluid and also to transmit to the harvester 20 a hydraulic pressure measurement. As best shown in FIG. 8, each of the exemplary solenoid valves 66 includes a valve housing 68, a spindle 76 and a solenoid 25. The valve housing 68 has an inlet opening 70, an outlet opening 72, a first direction opening 74 and a second direction opening 74. A spindle 76 is positioned within an inner bore of the valve housing 68 and is moveable therein on opposite lateral directions that are perpendicular to the longitudinal direction. When it is in a first position for keeping the bottom saw 38 in a resting position, the hydraulic fluid flows through the valve housing 68 from the inlet opening 70 and out the outlet opening 72 and back to the hydraulic manifold 56. The spindle 76 is operably coupled with a solenoid for moving the spindle 68 in opposite lateral directions relative to the housing 32 of the harvester head 22 and relative to the hydraulic manifold 56. Movement of the spindle 76 in the one lateral direction causes the hydraulic fluid to flow from the inlet opening 70 and into one of the directional openings 74 where the fluid is then conveyed to the hydraulic actuator 45 for moving the bottom saw 38 in one direction, e.g., to make a cut. Movement of the spindle 76 in an opposite lateral direction causes the hydraulic fluid to flow from the inlet opening 70 into the other directional opening 74 where the fluid is then conveyed to the hydraulic actuator 45 for moving the bottom saw 38 in an opposite direction, e.g., to return the bottom saw 38 to its resting position. The spindle 76 has a travel distance of no more than one inch (1 in) from the first position to either of the second and third positions.

Referring now to FIGS. 8 and 10, the hydraulic manifold 56 also includes a solenoid valve 66 for turning the bottom saw 38 on and off. Movement of the spindle 76 in the associated solenoid valve 66 in one lateral direction directs the hydraulic fluid to a hydraulic motor 41 to power the bottom saw 38. Movement of the spindle 76 in the opposite lateral direction stops the flow of hydraulic fluid to the hydraulic motor 41, thereby stopping the bottom saw 38.

The hydraulic manifold and valve assembly 36 also includes a proportional valve 64 and a solenoid valve 66 for controlling movement of the non-stationary delimbing knives 54. Movement the spindle 76 of the associated solenoid valve 66 in one lateral direction channels hydraulic fluid to hydraulic actuators 55 to move the non-stationary delimbing knives 54 from the open positions to the closed positions, and movement of the spindle 76 in the opposite lateral direction directs hydraulic fluid to the hydraulic actuators 55 to move the non-stationary delimbing knives 54 from the closed positions to the open positions.

The hydraulic manifold and valve assembly 36 further includes a proportional valve 64 and a solenoid valve 66 for controlling movement of the arms 46 with the outer feed rollers 44. Movement of the spindle 76 of the associated solenoid valve 66 in one lateral direction channels hydraulic fluid to the hydraulic actuators 48 to move the outer feed rollers 44 from the open positions to the closed positions, and movement of the spindle 76 in the opposite lateral direction directs hydraulic fluid to the hydraulic actuators 48 to move the outer feed rollers 44 from the closed positions to the open positions. Movement of the spindle 76 is controlled by the solenoid 66 which applies a magnetic field to either attract or to repel the spindle 76.

The hydraulic manifold and valve assembly 36 additionally includes a solenoid valve 66 for powering the hydraulic motors that are coupled with the inner and outer feed rollers 44. Movement of the spindle 76 of the associated solenoid valve 66 in one lateral direction channels hydraulic fluid to the hydraulic motors 49 to rotate the feed rollers 42, 44 in one direction, and movement of the spindle 76 in the opposite lateral direction channels hydraulic fluid to the hydraulic motors 49 to rotate the feed rollers 42, 44 in an opposite direction.

The hydraulic manifold and valve assembly 36 is only configured for operating the bottom saw 38. Accordingly, the harvester head 22 additionally includes a plurality of top saw valves 78 which are located within the housing 32 separate from the hydraulic manifold and valve assembly 36 for turning on and off and also for controlling movement of the top saw 40. As best shown in FIG. 9, the top saw valves 78 are located in a longitudinal front area of the housing 32 and are spaced from the hydraulic manifold and valve assembly 36. The top saw valves 78 are in fluid communication with the hydraulic manifold and valve assembly 36 through, for example, the valves for the bottom saw 38, and/or with the hydraulic lines from the harvester 20 for receiving hydraulic fluid to power and move the top saw 40. A ½ inch to ¾ inch reducer is fluidly disposed between the hydraulic manifold and valve assembly 36 and the top saw valves 78. One of the top saw valves 78 is a solenoid valve 66 for turning on and off the top saw 40. Movement of the spindle 76 in this solenoid valve 66 in one direction channels hydraulic fluid to a hydraulic motor 43 to power the top saw 40, and movement of the spindle 76 in the opposite direction stops the flow of hydraulic fluid to the hydraulic motor 43 to stop the top saw 40.

Another of the top saw valves 78 is a solenoid valve 66 for controlling movement of the top saw 40. Movement of the spindle 76 in this solenoid valve 66 in the one lateral direction causes the hydraulic fluid to flow from the inlet opening 58 and into one of the directional openings 74 where the fluid is then conveyed to a hydraulic actuator 47 for moving the top saw 40 in one direction, e.g., to make a cut. Movement of the spindle 76 in an opposite lateral direction causes the hydraulic fluid to flow from the inlet opening 70 into the other directional opening 74 where the fluid is then conveyed to the hydraulic actuator 47 for moving the top saw 40 in an opposite direction, e.g., to return the top saw 40 to its resting position. Still another of the top saw valves 78 is a proportional valve 64 for controlling the volumetric flow rate of the hydraulic fluid flowing to the hydraulic actuator 47 for moving the top saw 40.

Another aspect of the present invention provides for a method of making a harvester head 22 assembly. The exemplary embodiment includes the step of preparing a housing 32 that extends in a longitudinal direction between opposite longitudinal ends and is rotatably joined with a frame 28. The harvester head 22 has three feed rollers 42, 44 which are powered by a plurality of feed roller hydraulic motors 49. Two of the feed wheels 44 are located on arms 46 which are pivotable relative to the housing 32 by a pair of arm hydraulic actuators 48. The harvester head 22 also includes a pair of non-stationary delimbing knives 54 which are pivotable relative to the housing 32 by a pair of knife hydraulic actuators 55. The harvester head 22 further includes a top saw 40 which is powered by a top saw hydraulic motor 43 and is pivotable relative to the housing 32 by a top saw hydraulic actuator 47. The harvester head 22 still further includes a bottom saw 38 which is powered by a bottom saw hydraulic motor 41 and is pivotable relative to the housing 32 by a bottom saw hydraulic actuator 45.

The method continues with the step of positioning a generally rectangularly-shaped hydraulic manifold 56 within the housing 32 in an orientation such that a long dimension of the rectangular shape extends in the longitudinal direction. The method proceeds with the step of joining a plurality of solenoid valves 66 with the hydraulic manifold 56 and fluidly connecting the solenoid valves 66 with the hydraulic bottom saw hydraulic actuator 45, the bottom saw hydraulic motor 41, the knife hydraulic actuators 55, the arm hydraulic actuators 48 and the feed motor hydraulic motors 49.

The method also includes the step of removing a hydraulic pressure regulator from the hydraulic manifold 56. The method further includes the step of positioning a top saw motor solenoid valve 66, a top saw actuator proportional valve 64 and a top saw actuator solenoid valve 66 in the housing 32 and separate from the hydraulic manifold 56 and fluidly connecting the top saw solenoid motor solenoid valve 66 with the top saw hydraulic motor 43 and fluidly connecting the top saw actuator proportional and solenoid valves 64, 66 with the top saw hydraulic actuator 47.

Obviously, many modifications and variations of the present invention are possible in light of the above teachings and may be practiced otherwise than as specifically described while within the scope of the appended claims.

What is claimed is:

1. A harvester head assembly, comprising:
   a frame that is generally U-shaped;
   a housing rotatably coupled with said frame and being rotatable between a horizontal orientation and a vertical orientation, said housing extending in a longitudinal direction between opposite longitudinal ends;
   a feed system including three feed rollers including a central feed roller and a pair of outer feed rollers that are moveable relative to said housing;
   a top saw located adjacent one of said longitudinal ends of said housing and a bottom saw located adjacent the other of said longitudinal ends of said housing, said top and bottom saws being pivotable relative to said housing;
   a pair of non-stationary delimbing knives pivotally coupled with said housing and pivotable between open and closed positions;
   a hydraulic manifold and valve assembly operable to receive a hydraulic fluid and to channel the hydraulic fluid to at least power said feed system, rotate said outer feed rollers relative to said housing, power said bottom saw, rotate said bottom saw and to rotate said delimbing knives relative to said housing;
   said hydraulic manifold and valve assembly including a manifold that is generally rectangularly shaped and has a long dimension that extends in said longitudinal direction; and
   said hydraulic manifold and valve assembly further including a plurality of solenoid valves, each solenoid valve having a spindle that is moveable in opposite lateral directions that are generally perpendicular to said longitudinal direction.

2. The harvester head assembly as set forth in claim 1 wherein each of said spindles in said solenoid valves is moveable in said opposite lateral directions by no more than one inch.

3. The harvester head assembly as set forth in claim 1 further including a plurality of top saw valves for controlling movement of said top saw, said top saw valves being separate from said hydraulic manifold and valve assembly.

4. The harvester head assembly as set forth in claim 3 wherein said plurality of top saw valves includes a top saw motor solenoid valve for channeling the hydraulic fluid to a top saw hydraulic motor to power said top saw.

5. The harvester head assembly as set forth in claim 4 wherein said plurality of top saw valves further includes a top saw actuator solenoid valve for channeling the hydraulic fluid to a top saw hydraulic actuator to pivot said top saw relative to said housing.

6. The harvester head assembly as set forth in claim 5 wherein said plurality of top saw valves further includes a top saw actuator proportional valve for controlling a volumetric flow rate of hydraulic fluid to said top saw hydraulic actuator.

7. The harvester head assembly as set forth in claim 1 wherein said top saw has a maximum cutting diameter of approximately seventeen inches.

8. The harvester head assembly as set forth in claim 1 wherein said bottom saw has a maximum cutting diameter of approximately twenty-two inches.

9. The harvester head assembly as set forth in claim 1 wherein said feed rollers are located longitudinally between said top and bottom saws.

10. The harvester head assembly as set forth in claim 1 wherein said outer feed rollers are mounted on arms that are pivotable relative to said housing.

11. The harvester head assembly as set forth in claim 1 further including a plurality of proportional valves fluidly coupled between said hydraulic manifold and at least two of said solenoid valves for controlling a volumetric flow rate of the hydraulic fluid to at least one hydraulic actuator.

12. A method of making a harvester head assembly, comprising the steps of:
preparing a housing that extends in a longitudinal direction between opposite longitudinal ends and is rotatably joined with a frame and has three feed rollers and a pair of delimbing knives and top and bottom saws, the feed rollers being operably coupled with feed roller hydraulic motors, two of the feed rollers being located on pivotable arms, arm hydraulic actuators extending between the housing and the arms for pivoting the arms relative to the housing, the delimbing knives being operably coupled with knife hydraulic actuators for pivoting the delimbing knives relative to the housing, the top saw being operably coupled with a top saw hydraulic motor for powering the top saw and a top saw hydraulic actuator for pivoting the top saw relative to the housing, and the bottom saw being operably coupled with a bottom saw hydraulic motor for powering the bottom saw and a bottom saw actuator for pivoting the bottom saw relative to the housing;
positioning a generally rectangularly-shaped hydraulic manifold in the housing in an orientation such that a long dimension of the rectangular shape extends in the longitudinal direction; and
joining a plurality of solenoid valves with the hydraulic manifold and fluidly connecting the solenoid valves with the bottom saw hydraulic actuator, the bottom saw hydraulic motor, the knife hydraulic actuators, the arm hydraulic actuators and the feed motor hydraulic motors.

13. The method as set forth in claim 12 further including the steps of positioning a top saw motor solenoid valve in the housing and spaced from the hydraulic manifold and fluidly connecting the top saw motor solenoid valve with the top saw hydraulic motor.

14. The method as set forth in claim 13 further including the steps of positioning a top saw actuator proportional valve and a top saw actuator solenoid valve in the housing and spaced from the hydraulic manifold and fluidly connecting the top saw actuator proportional and solenoid valves with the top saw hydraulic actuator.

* * * * *